H. A. KING.
AIRSHIP PROPELLER.
APPLICATION FILED MAY 10, 1910.
1,002,703.
Patented Sept. 5, 1911.
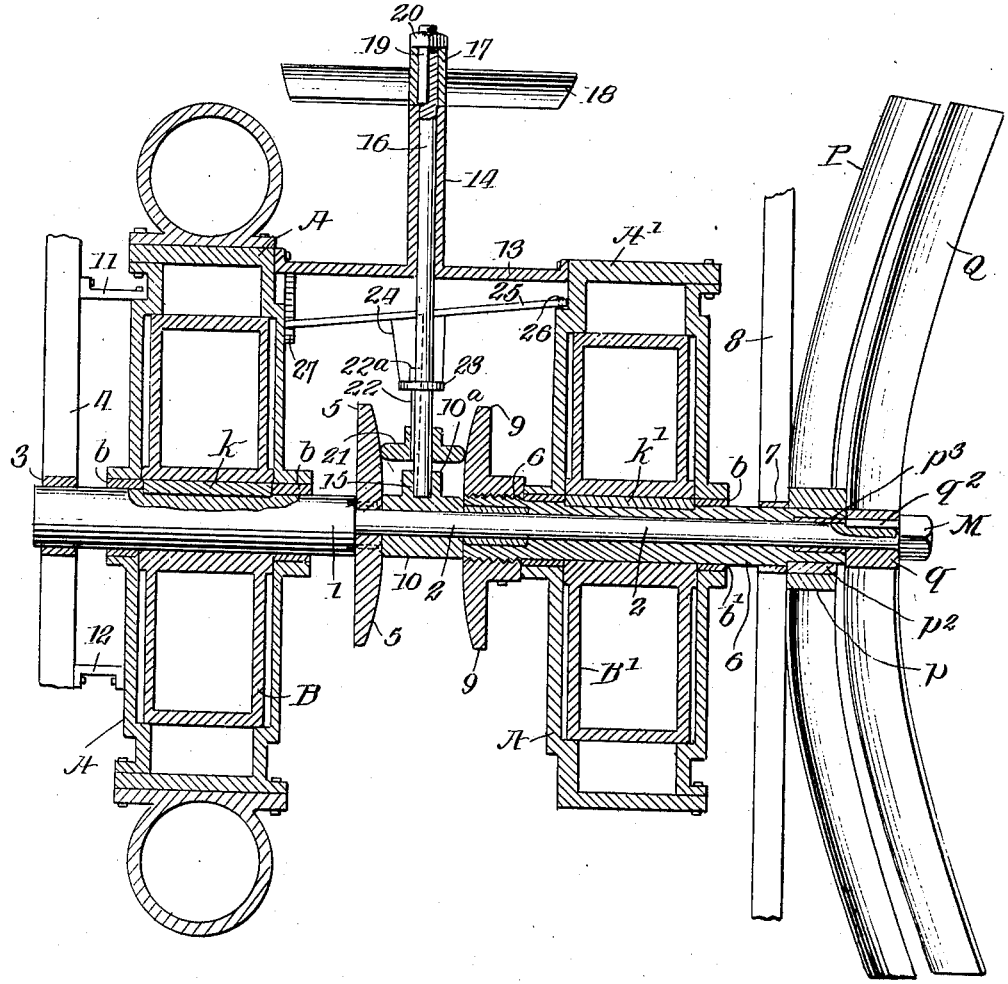
WITNESSES:
Samuel E. Wade
L. H. Stanley
INVENTOR
HOMER A. KING
BY Munn & Co.
ATTORNEYS

UNITED STATES PATENT OFFICE.

HOMER ARTHUR KING, OF COLTON, CALIFORNIA.

AIRSHIP-PROPELLER.

1,002,703.  Specification of Letters Patent.  Patented Sept. 5, 1911.

Application filed May 10, 1910. Serial No. 560,520.

*To all whom it may concern:*

Be it known that I, HOMER ARTHUR KING, a citizen of the United States, residing at Colton, in the county of San Bernardino and State of California, have invented a new and useful Airship-Propeller, of which the following is a specification.

My invention relates to improvements in propelling devices, and it consists in the combinations, constructions and arrangements herein described and claimed.

An object of my invention is to provide a novel form of propeller having a double set of blades, one set mounted on a rod, and the other set mounted on a sleeve carried by the rod, the propellers being oppositely inclined, and being arranged to revolve in opposite directions.

A further object of my invention is to provide an auxiliary propeller, which is designed to give a motion at right angles to the first named propellers.

A further object of my invention is to provide means for operating the propellers simultaneously, and for throwing the auxiliary propeller out of gear when desired.

My invention is illustrated in the accompanying drawing which is a central vertical section through the device.

In carrying out my invention, I provide a main shaft 1 having a reduced portion 2, as shown in the drawings. This shaft is supported at one end in bearings 3 carried by the frame member 4. Mounted upon the reduced portion 2 and secured to the main larger portion 1 of the shaft is a friction disk 5. A sleeve 6 is mounted in bearings 7 in the frame member 8 for revolution. The inner end of the sleeve is threaded to receive the threaded portion of a friction wheel 9, which is similar in shape to the friction wheel 5. Between the two friction disks 5 and 9 is a non-revolving spacing member 10, which has an extension 10ª on its upper side that is provided with a recess for receiving the shaft of the auxiliary propeller, as will be hereinafter explained.

At A, I have shown the casing of a rotary engine, this casing being braced to the frame member 4 by means of the braces 11 and 12. Within the casing is the rotating piston B, which, as will be seen from the drawing, is keyed to the larger portion 1 of the shaft at K, and which is provided with suitable bearing parts $b$. This rotary engine is only one of many means that might be used to drive the shaft 1, and the specific construction of the engine forms no part of the present invention, but will be made the subject of a divisional application. Only such parts, therefore, of the engine as are necessary to show its connection with the shaft are described. At A′ is shown the casing of another rotary engine having a rotary piston B′. This casing, it will be understood is also stationary, as is the casing A, while the rotary piston B′ is connected directly with the sleeve 6 by means of the key $k'$. Between the sleeve and the casing are the bearing parts $b'$.

Between the casings A and A′ is a brace member 13 having an upwardly extending sleeve 14. The sleeve 14 and the socket 15 in the extension 10ª form bearing members for a vertically disposed shaft 16. The upper end of this shaft is keyed to the hub 17 of a horizontal propeller 18, the key 19 being kept in place by means of a nut 20. Between the friction disks 5 and 9 is a friction disk 21, which is slidably keyed to the upright shaft 16 by means of a key 22. The latter is formed as shown in the drawing, and is provided with a head 22ª arranged to be engaged by a collar 23 loosely embracing the shaft 16 and suspended thereon by means of the wires 24. The latter are attached to a lever 25 pivoted at 26 on the casing A′. The opposite end of this lever is arranged to be supported by a series of teeth 27 carried on the casing A′.

On the outer end of the sleeve 6 near the support 8 is a propeller P whose blades are inclined in the manner shown in the figure. This propeller is curved outwardly. The hub $p$ of the propeller P is keyed to the sleeve 6 by a key $p^2$. Between the sleeve 6 and that portion of the shaft 2, within the hub $p$ is a bearing member $p^3$. A second propeller Q is disposed on the end of the shaft 2, the hub $q$ of the propeller Q being keyed to the shaft 2 by means of the key $q^2$. The propeller Q is held in place by means of a nut M on the end of the shaft 2.

From the foregoing description of the various parts of the device, the operation thereof may be readily understood.

The rotary engines are driven separately, and, therefore, the speed of the shaft 2 and of the sleeve 6 may be independently controlled. These engines are designed to be run in opposite directions, so as to cause the propeller P to revolve in one direction, while the propeller Q revolves in the other direction, but since these two propellers are oppositely inclined their propelling effect will be combined, and will be exerted in the same direction.

The two friction disks 5 and 9, which are rotated in opposite directions, will both act to impart a rotary movement to the intervening friction disk 21. The latter will, therefore, cause the rotation of the shaft 16, and the consequent rotation of the propeller 18, when the disk 21 is secured to the shaft 16. This is the case as long as the lever 25 is in the position indicated in the figure, but when the lever is shifted to an upper position, so as to withdraw the slidable key 22 from the disk 21, the latter will turn idly around the shaft, and, therefore, the rotation of the propeller 18 will cease. On the reversal of the movement of the lever 25, the propeller will again be brought into play.

My invention is primarily designed to be used in connection with the propulsion of airships. Thus when it is desired to descend slowly, the horizontal propeller may be set in motion so as to cause a lifting effect which will counteract the effect of gravity, thus permitting the machine to descend safely. During the forward flight of the machine it can be disconnected.

I claim:—

1. In a propelling device, a stationary frame member provided with a bearing, a shaft having an enlarged portion rotatably supported at one end in said bearing, means for driving said shaft, said shaft having a reduced portion, a friction disk carried by said reduced portion at one end and a propeller secured to said reduced portion at the other end, a second frame member provided with a bearing, a sleeve disposed on said reduced shaft portion and arranged to extend through the bearing on said second frame member, a friction disk secured on one end of said sleeve, a propeller secured at the other end of said sleeve between said first named propeller and said second frame member, means for rotating said sleeve independently of said shaft, a nonrevolving spacing member disposed about said reduced portion of the shaft between said friction disks, a vertical shaft revolubly supported on said spacing member, an auxiliary propeller secured to said vertical shaft, a third friction disk loosely mounted on said vertical shaft and arranged to engage each of said friction disks on its opposite edges, a slidable key carried by said vertical shaft for securing said third named friction disk to said shaft, a collar loosely disposed on said vertical shaft, a pivoted lever, means for suspending said collar from said pivoted lever, said collar being connected with said slidable key, and means for locking said lever in adjustable positions.

2. In a propelling device, a stationary frame member provided with a bearing, a shaft having an enlarged portion rotatably supported at one end in said bearing, means for driving said shaft, said shaft having a reduced portion, a friction disk carried by said reduced portion at one end and a propeller secured to said reduced portion at the other end, a second frame member provided with a bearing, a sleeve disposed on said reduced shaft portion and arranged to extend through the bearing on said second frame member, a friction disk secured on one end of said sleeve, a propeller secured at the other end of said sleeve between said first named propeller and said second frame member, means for rotating said sleeve independently of said shaft, a nonrevolving spacing member disposed about said reduced portion of the shaft between said friction disks, a vertical shaft revolubly supported on said spacing member, an auxiliary propeller secured to said vertical shaft, a third friction disk loosely mounted on said vertical shaft and arranged to engage each of said friction disks on its opposite edges, said third mentioned disk being normally secured to said vertical shaft, and means for disconnecting said third mentioned friction disk from said vertical shaft, thereby disconnecting said auxiliary propeller.

In testimony whereof I have signed my name to this specification in the presence of two subscribing witnesses.

HOMER ARTHUR KING.

Witnesses:
CHARLES B. FULLER,
R. CRAVENS HOWE.